UNITED STATES PATENT OFFICE.

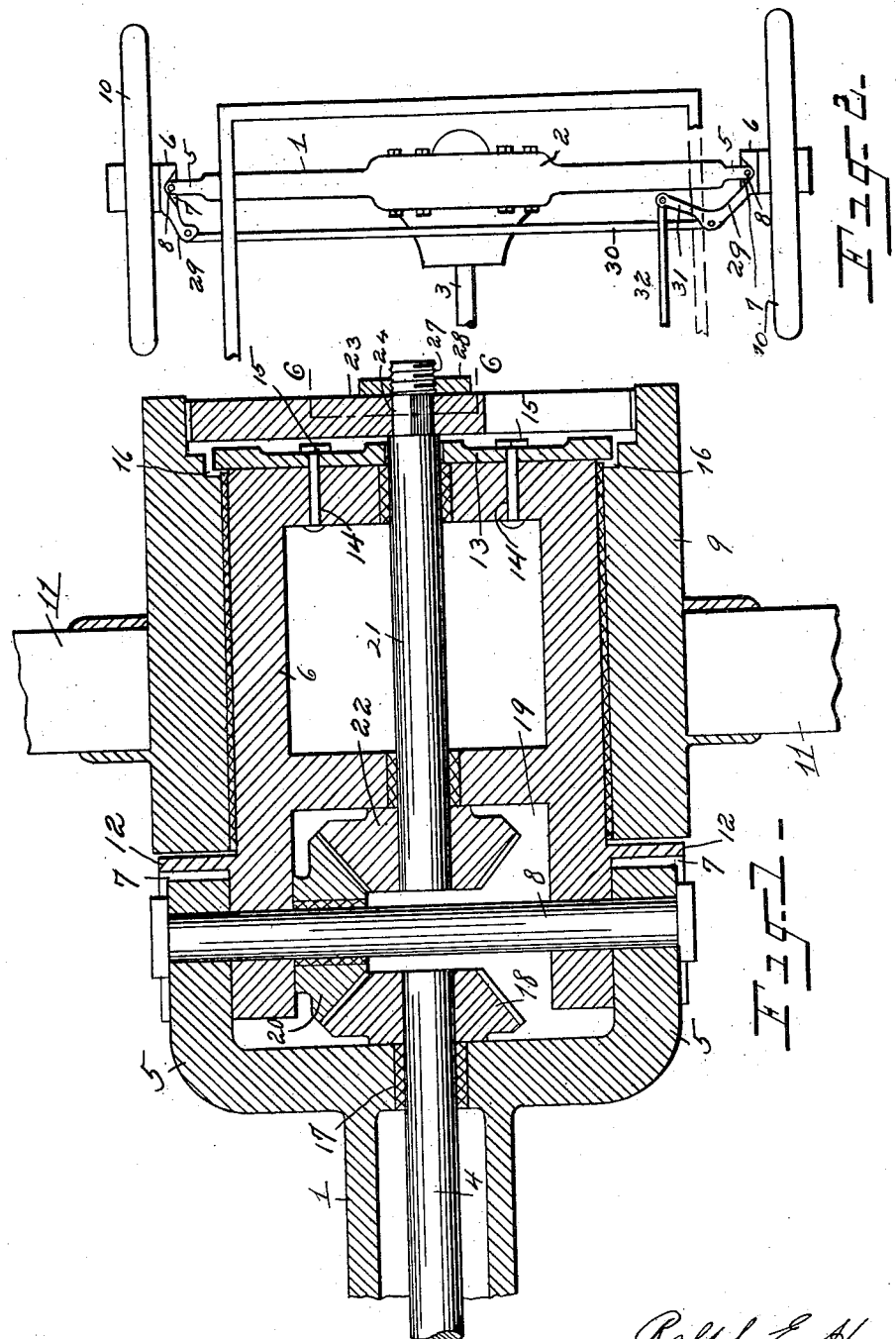

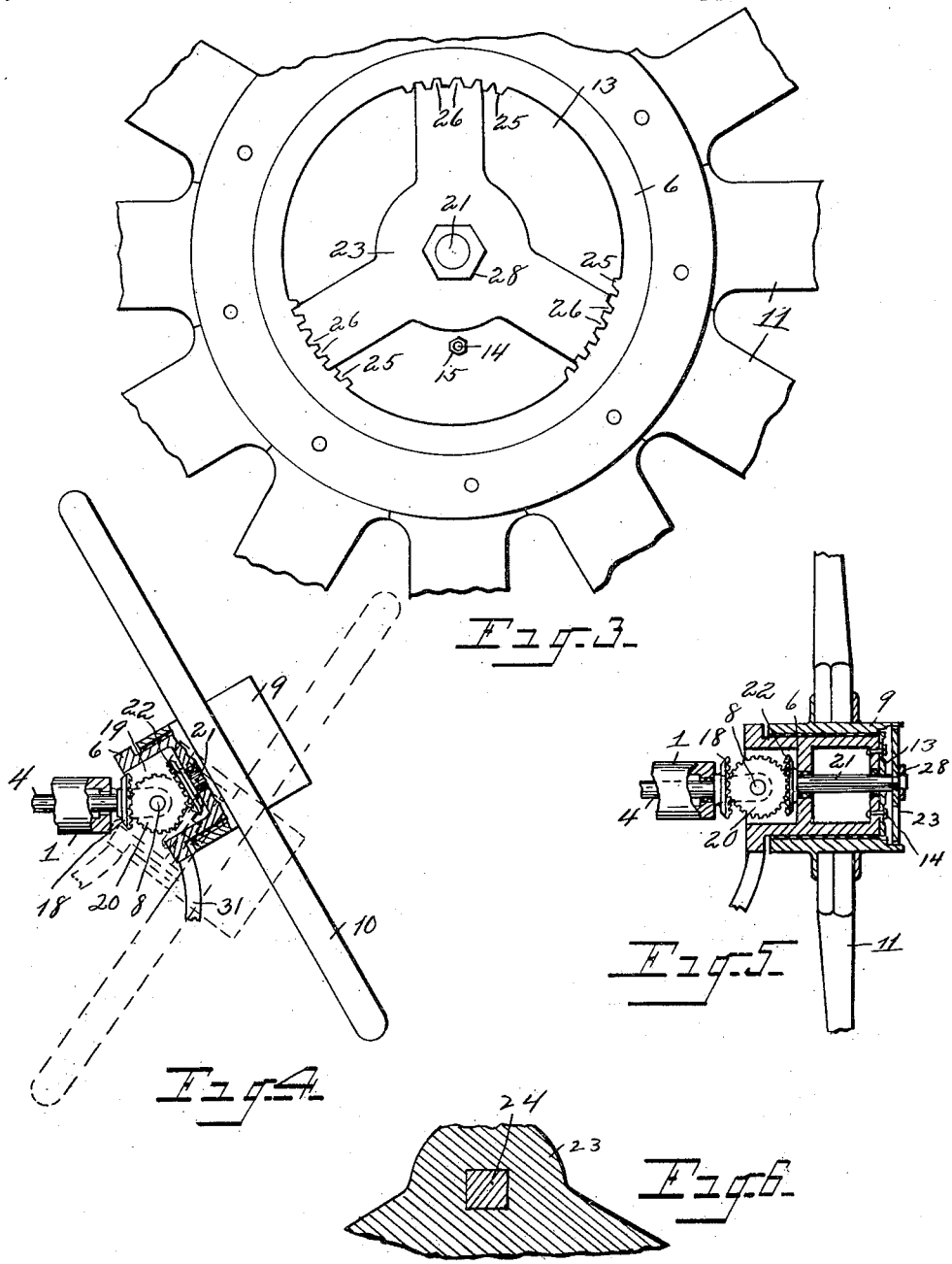

RALPH E. HAMILTON, OF DETROIT, MICHIGAN.

DRIVING MECHANISM FOR MOTOR-VEHICLES.

1,126,992.   Specification of Letters Patent.   Patented Feb. 2, 1915.

Application filed April 29, 1912. Serial No. 693,775.

*To all whom it may concern:*

Be it known that I, RALPH E. HAMILTON, a citizen of the United States, residing at Detroit, in the county of Wayne, State of Michigan, have invented certain new and useful Improvements in Driving Mechanism for Motor-Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to driving mechanism for motor vehicles, and consists in the construction and arrangement of parts hereinafter more fully set forth and pointed out particularly in the claim.

The object of the invention is to provide simple and efficient means for driving the front wheels of a motor vehicle, wherein provision is made for turning said wheels for the purpose of steering the vehicle without interfering with the application of the driving power thereto.

The above object is attained by the mechanism illustrated in the accompanying drawings, in which:—

Figure 1 is a view in horizontal section through one end of the front axle, the spindle pivotally connected thereto, and the hub of the wheel journaled on said spindle, illustrating one mode of driving the hub from a shaft carried by said axle, in accordance with my invention. Fig. 2 is a fragmentary view in top plan showing the front axle of a vehicle, the wheels pivotally connected with the ends thereof in accordance with my invention, and the method of actuating the wheels to effect a steering of the vehicle. Fig. 3 is a fragmentary view in end elevation of the hub of one of the driving wheels. Fig. 4 is a fragmentary view partly in horizontal section, showing the driving connection through the medium of which the wheel is rotated, and illustrating by full and dotted lines the movement of the wheel for steering purposes. Fig. 5 is a similar view in complete horizontal section through the spindle and hub, the driving mechanism appearing in elevation. Fig. 6 is an enlarged fragmentary view in section, as on line 6—6 of Fig. 1.

Referring to the drawings by the characters of reference marked thereon, 1 designates the front axle which is preferably hollow, and which at its longitudinal center is provided with the usual differential gear case 2 adapted to contain any suitable differential gearing, not shown. Extending into the gear case 2 is the motor or driving shaft 3. Each end of the axle 1 is provided with a shaft section 4 adapted to receive motion in the usual way from a differential gearing. At each end of the axle 1 is a fork 5, the sides of which stand in vertical alinement. Entered between the sides of the fork 5, at each end of the axle, is a hub spindle 6, having in the periphery thereof, at its inner end, recesses 7 in which the sides of the fork lie. Passing vertically through the fork sides, and through the inner end of each of the spindles 6, is a pin 8. Said pins effect a pivotal connection between the forks 5 and the spindles 6 that allows said spindles to swing in the arc of a horizontal circle concentric with said pins. Journaled on each of the spindles 6 is a hub 9 of a vehicle wheel 10, said hub carrying the usual spokes 11. The inner end of each of the hubs abuts against an annular shoulder 12 on the spindle 6. To confine the hub upon the spindle there is employed a retaining plate 13, circular in form, which is fastened to the end of the spindle by the plates 14, carrying on their outer ends the nuts 15. The diameter of the plate 13 is greater than that of the spindle so that its perimeter extends into a rabbet 16 in the end of the hub and retains the hub upon the spindle.

The outer end of each of the shaft sections 4 is journaled at 17 in the crown of the fork 5, and carries a beveled gear 18 fixed thereon. In the inner end of each of the spindles 6 is a recess 19, which forms a housing for the driving gears. Journaled on the pin 8 in said housing is a beveled gear 20 which meshes with the gear 18. Centrally disposed with respect to the spindle 6, and extending longitudinally thereof to rotate in suitable bearings, is a short shaft 21. The inner end of this shaft extends into the chamber or housing 19 and carries a beveled gear 22 which is fixed thereon, and which meshes with the gear 20. By this arrangement a rotation of the shaft section 4 will impart a rotary movement to the short shaft 21 journaled in the spindle 6. To connect shaft 21 with the hub 9 there is employed a spider 23 provided with a central aperture which receives the square end 24 of the shaft 21. Within the circular opening in the outer end of the hub 9, and attached to the inner wall thereof at three points therein, are teeth 25 which extend parallel with the axis of the hub. The outer ends of the arms of the spider 23 are provided with like teeth 26 adapted to slide into meshing engagement with the teeth of the hub, thereby, when said parts are in operative engagement, effecting a driving connection between the hub and spider. To secure the spider in place in the outer end of the hub, the shaft 21 is threaded, as shown at 27, (see Fig. 1) and screwed thereonto, into engagement with said spider, is a nut 28. It will now be apparent that a rotation of the shaft 21 will impart a rotary movement to the hub 19 upon the spindle 6.

Connected to the spindles 6 of each of the wheels is a steering arm 29, said arms being pivotally connected by a cross-rod 30. From one of the arms 29 is a projecting member 31, to the outer end of which is pivoted an actuating rod 32, controlled by the steering mechanism, not shown. By a movement of the rod 32 the spindles 6 may be caused to swing upon the centers 8 to change the direction of travel of the vehicle, as will be well understood.

When the steering device is actuated the spindles 6 are swung in the arc of a horizontal circle concentric with the pivot pins 8. To accommodate this movement the gears 22 on the shafts 21 in said spindles travel around the arcs of the gears 20, as clearly shown in Fig. 4. The swinging of the wheels 10 does not interfere with the driving mechanism as the shafts 21 within the spindles of the hubs rotate continuously, irrespective of the position in which the wheels 10 may stand. The fact that the wheels are being driven through the gears 18, 20 and 22 does not in any sense impede or interfere with the turning of the wheels when it is desired to change the direction of travel of the vehicle.

Having thus fully set forth my invention, what I claim as new, and desire to secure by Letters Patent, is:—

In a driving mechanism for motor vehicles, an axle having a fork, a shaft journaled in said axle, a beveled gear wheel mounted upon said axle shaft, a hollow spindle having an annular shoulder at the inner end thereof, said shoulder being cut away to provide clearance for the ends of said fork, pivotal means connecting the ends of said axle fork to said spindle, a shaft journaled concentrically of said hollow spindle, a beveled gear wheel revolubly mounted upon said pivotal means within the end of said spindle and meshing with the beveled gear wheel of said axle shaft for imparting movement to said spindle shaft, a wheel hub of a greater diameter than the annular shoulder of said spindle revolubly mounted upon said spindle and having the inner end thereof abutting the shoulder of said spindle and the opposite end thereof rabbeted and provided with teeth, a spider detachably mounted upon said shaft within the rabbeted end of said hub and having teeth interlocked with the teeth of said hub, a retaining plate interposed between said spider and said hub and secured to said spindle to prevent said hub from becoming accidentally displaced relatively to said spindle, and means upon said spindle shaft against said spider to prevent displacement of said spider.

In testimony whereof, I sign this specification in the presence of two witnesses.

RALPH E. HAMILTON.

Witnesses:
F. M. BEARDSLEY,
M. E. BROESAMLE.

Copies of this patent may be obtained for five cents each, by addressing the "Commissioner of Patents, Washington, D. C."